(12) United States Patent
Mahanta et al.

(10) Patent No.: US 12,462,188 B2
(45) Date of Patent: Nov. 4, 2025

(54) DETERMINING DATA SUITABILITY FOR TRAINING MACHINE LEARNING MODELS

(71) Applicant: SAP SE, Walldorf (DE)

(72) Inventors: Prabal Mahanta, Bangalore (IN); Abdul-Gafoor Mohamed, Bangalore (IN)

(73) Assignee: SAP SE, Walldorf (DE)

( * ) Notice: Subject to any disclaimer, the term of this patent is extended or adjusted under 35 U.S.C. 154(b) by 1098 days.

(21) Appl. No.: 17/368,060

(22) Filed: Jul. 6, 2021

(65) Prior Publication Data

US 2023/0008628 A1     Jan. 12, 2023

(51) Int. Cl.
*G06N 20/00*     (2019.01)
*G06F 16/21*     (2019.01)

(52) U.S. Cl.
CPC .......... *G06N 20/00* (2019.01); *G06F 16/211* (2019.01)

(58) Field of Classification Search
CPC ......... G06N 20/00; G06N 3/09; G06F 16/211
See application file for complete search history.

(56) References Cited

U.S. PATENT DOCUMENTS

| | | | | |
|---|---|---|---|---|
| 10,963,719 B1 * | 3/2021 | Hantehzadeh | .......... | G06F 18/24 |
| 2019/0205620 A1 * | 7/2019 | Yi | ............................ | G06N 3/08 |
| 2021/0263839 A1 * | 8/2021 | Kim | .................... | G06F 11/3058 |
| 2021/0264209 A1 * | 8/2021 | Kim | .................... | G06F 18/2148 |
| 2021/0343129 A1 * | 11/2021 | Subramanian | ........ | G06F 18/214 |
| 2021/0406772 A1 * | 12/2021 | Shillingford | .......... | G06F 40/169 |

OTHER PUBLICATIONS

Viikki, et al., "Evaluating Training Data Suitability of Decision Tree Induction," J. Medical Systems, vol. 25, No. 2, 2001. (Year: 2001).*
M. Labiadh, C. Obrecht, C. Ferreira da Silva and P. Ghodous, "On the suitability of Data Selection for Cross-building Knowledge Transfer," 2019 International Conference on High Performance Computing & Simulation (HPCS), Dublin, Ireland, 2019, pp. 818-824 , doi: 10.1109/HPCS48598.2019.9188132. (Year: 2019).*

* cited by examiner

*Primary Examiner* — James T Tsai
(74) *Attorney, Agent, or Firm* — Klarquist Sparkman, LLP (57) ABSTRACT

Technologies are provided for determining a suitability of data payloads for training a machine learning model. A schema can be generated based on sample data payloads that have different data formats. The sample data payloads (and/or additional data payloads) can be converted to a format that conforms to the schema. Feature vectors can then be generated based on the converted data payloads, and used to determine a suitability of the data payloads for training a machine learning model. If the data payloads are sufficiently suitable, the converted data payloads can be used to train the machine learning mode. Otherwise, the schema may be annotated and new converted payloads may be generated based on the annotated schema. The feature vector generation and suitability analysis can then be repeated.

17 Claims, 9 Drawing Sheets

411
```
{
"_id": "6341e679-36ab-8332-52cd-38ef258a4c28",
"isActive": true,
"industry": "$3,006.81",
"scenarioid": "604e19d8297328 79f5d292fa",
"country": 21,
"subindustry": "blue",
"name": "Battle",
"company": "FOOCO",
"email_address": "battle@fooco.com",
"about": "Incididunt culpa voluptate exercitation",
"registered": "2020-03-01T09:42:26 -06:-30",
"tags": [" ", " ", " "],
"goods_and_services": "{{}}",
"purchase_order": "{{}}"
}
```

413
```
{
"guid": "7960c985-41df-4133-85eb-77df922f7a90",
"active": true,
"industry": "$5,137.04",
"scenarioid": "604e19d8297328 79f5d292fa",
"country": 14,
"subindustry": "blue",
"name": "Carey",
"company": "FAKELAB",
"email": "carey33@fakelab.com",
"info": "Dolor fugiat eu aute culpa sit nostrud",
"entered": "2021-02-01T11:13:44 -04:00",
"supplymarket": "{{}}",
"sourcingstrategy": "{{}}",
"RFIRFP": "{{}}",
"contractwithvendor": "{{}}",
"supplier": "{{}}",
"suppliertorespond": "{{}}",
"purchaserequisition": "{{}}",
"purchaseorder": "{{}}",
"deliveryandexpedite": "{{}}",
"goodsservices": "{{}}"
}
```

FIG. 5

511
```
{
  "_id": "uuid",
  "isActive": "boolean",
  "industry": "currency",
  "scenarioid": "uuid",
  "country": "integer",
  "subindustry": "string",
  "name": "string",
  "company": "string",
  "email_address": "email",
  "about": "string",
  "registered": "datetime",
  "tags": "array:string",
  "goods_and_services": "string",
  "purchase_order": "string"
}
```

513
```
{
  "guid": "uuid",
  "active": "boolean",
  "industry": "currency",
  "scenarioid": "uuid",
  "country": "integer",
  "subindustry": "string",
  "name": "string",
  "company": "string",
  "email": "email",
  "info": "string",
  "entered": "datetime",
  "supplymarket": "string",
  "sourcingstrategy": "string",
  "RFIRFP": "string",
  "contractwithvendor": "string",
  "supplier": "string",
  "suppliertorespond": "string",
  "purchaserequisition": "string",
  "purchaseorder": "string",
  "deliveryandexpedite": "string",
  "goodsservices": "string"
}
```

521
```
{
  "guid": "uuid",
  "active": "boolean",
  "industry": "currency",
  "scenarioid": "uuid",
  "country": "integer",
  "subindustry": "string",
  "name": "string",
  "company": "string",
  "email": "email",
  "about": "string",
  "registered": "datetime",
  "tags": "array:string",
  "supplymarket": "string",
  "sourcingstrategy": "string",
  "RFIRFP": "string",
  "contractwithvendor": "string",
  "supplier": "string",
  "suppliertorespond": "string",
  "purchaserequisition": "string",
  "purchaseorder": "string",
  "deliveryandexpedite": "string",
  "goodsservices": "string"
}
```

523
```
_id : guid
isActive : active
email_address : email
info : about
entered : registered
goods_and_services : goodsservices
purchase_order : purchaseorder
```

FIG. 6

611
```
{
"guid": "6341e679-36ab-8332-52cd-38ef258a4c28",
"active": true,
"industry": "$3,006.81",
"scenarioid": "604e19d8297328795d292fa",
"country": 21,
"subindustry": "blue",
"name": "Battle",
"company": "FOOCO",
"email": "battle@fooco.com",
"about": "Incididunt culpa voluptate exercitation",
"registered": "2020-03-01T09:42:26 -06:-30",
"tags": [ " ", " ", " " ],
"purchaseorder": "{{}}",
"goodsservices": "{{}}"
}
```

613
```
{
"guid": "7960c985-41df-4133-85eb-77df922f7a90",
"active": true,
"industry": "$5,137.04",
"scenarioid": "604e19d8297328795d292fa",
"country": 14,
"subindustry": "blue",
"name": "Carey",
"company": "FAKELAB",
"email": "carey33@fakelab.com",
"about": "Dolor fugiat eu aute culpa sit nostrud",
"registered": "2021-02-01T11:13:44 -04:00",
"supplymarket": "{{}}",
"sourcingstrategy": "{{}}",
"RFIRFP": "{{}}",
"contractwithvendor": "{{}}",
"supplier": "{{}}",
"suppliertorespond": "{{}}",
"purchaserequisition": "{{}}",
"purchaseorder": "{{}}",
"deliveryandexpedite": "{{}}",
"goodsservices": "{{}}"
}
```

DETERMINING DATA SUITABILITY FOR TRAINING MACHINE LEARNING MODELS

BACKGROUND

In many cases, computer applications that process data have to deal with data that is formatted using different data formats. This can be the case even when the data at issue pertains to a common domain. For example, a computer system that processes sales orders may have to deal with sales order data payloads that come in a wide variety of formats. In many cases where payloads with different data formats must be processed, converting the payloads to a common format for processing can be a time-consuming and labor-intensive job. Furthermore, when payloads in different formats are received, it may be difficult to ascertain a suitability of the data contained in the various payloads for common processing.

Therefore, there is room for improvement in technologies for converting disparate data payloads to a common format and determining a suitability of various data payloads for common processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a method comprises receiving a plurality of data payloads; converting the plurality of data payloads to a format that conforms to a schema; generating feature vectors for the plurality of data payloads using the schema; and determining a suitability of the plurality of data payloads for training a machine learning model based on the feature vectors.

In another example embodiment, a system comprises a computing device comprising a processor and a memory storing instructions that, when executed by the processor, cause the computing device to perform operations, the operations comprising: receiving a plurality of data payloads; converting the plurality of data payloads to a format that conforms to a schema; generating feature vectors for the plurality of data payloads using the schema; and determining a suitability of the plurality of data payloads for training a machine learning model based on the feature vectors.

In another example embodiment, one or more computer-readable storage media storing instructions that, when executed by one or more processors, cause the one or more processors to perform operations, the operations comprising: generating a schema based on a plurality of data payloads, wherein the plurality of data payloads have different data formats; converting the plurality of data payloads into a format that conforms to the schema; generating feature vectors for the plurality of data payloads using the schema; and determining a suitability of the plurality of data payloads for training a machine learning model based on the feature vectors.

As described herein, a variety of other features and advantages can be incorporated into the technologies as desired.

BRIEF DESCRIPTION OF THE DRAWINGS

FIG. 5 is a diagram depicting example schemas.

DETAILED DESCRIPTION

Example 1

Overview

The description provided herein is directed to various technologies for generating schemas based on multiple data payloads having different data formats and determining the suitability of the multiple data payloads for training machine learning models.

When data payloads with different data formats are encountered, it can often be time-consuming and labor-intensive to convert the data payloads into a common format for processing. Furthermore, it can be difficult to ascertain how suitable the various data payloads in the different data formats are for use in training a machine learning model.

At least some of the embodiments disclosed herein address these problems by converting the data payloads to a common schema and extracting feature vectors from the converted data payloads. A schema can be generated based on sample data payloads that have different data formats. The sample data payloads (and/or additional data payloads) can be converted to a format that conforms to the schema. Feature vectors can then be generated based on the converted data payloads, and used to determine a suitability of the data payloads for training a machine learning model. If the data payloads are sufficiently suitable, the converted data payloads can be used to train the machine learning model. Otherwise, the schema may be annotated and new converted payloads may be generated based on the annotated schema. The feature vector generation and suitability analysis can then be repeated.

In a different or further embodiment, generating the schema comprises generating multiple schemas that correspond to multiple sample data payloads, and then generating a consolidated schema based on the multiple schemas. For example, common elements in the multiple schemas can be identified and mapped to the same element in the consolidated schema. In at least some scenarios, a coverage of the consolidated schema with respect to the multiple schemas can be determined. If a coverage level of the consolidated schema is not sufficiently high, then the multiple schemas can be annotated. Additionally or alternatively, mapping records that identify common element names can be created and/or edited to identify additional or alternative common elements among the multiple schemas. The annotated multiple schemas and/or the mapping records, can be used to generate a revised consolidated schema. A coverage of the revised consolidated schema with respect to the annotated schemas can be determined and, if it is still not at a sufficient level, the process can be repeated until the coverage level is sufficient.

Example 2

Example Systems and Methods for Determining the Suitability of Data Payloads for Training Machine Learning Models In any of the examples described herein, systems and methods can be provided for determining the suitability of data payloads for training one or more machine learning models.

Figure 1:
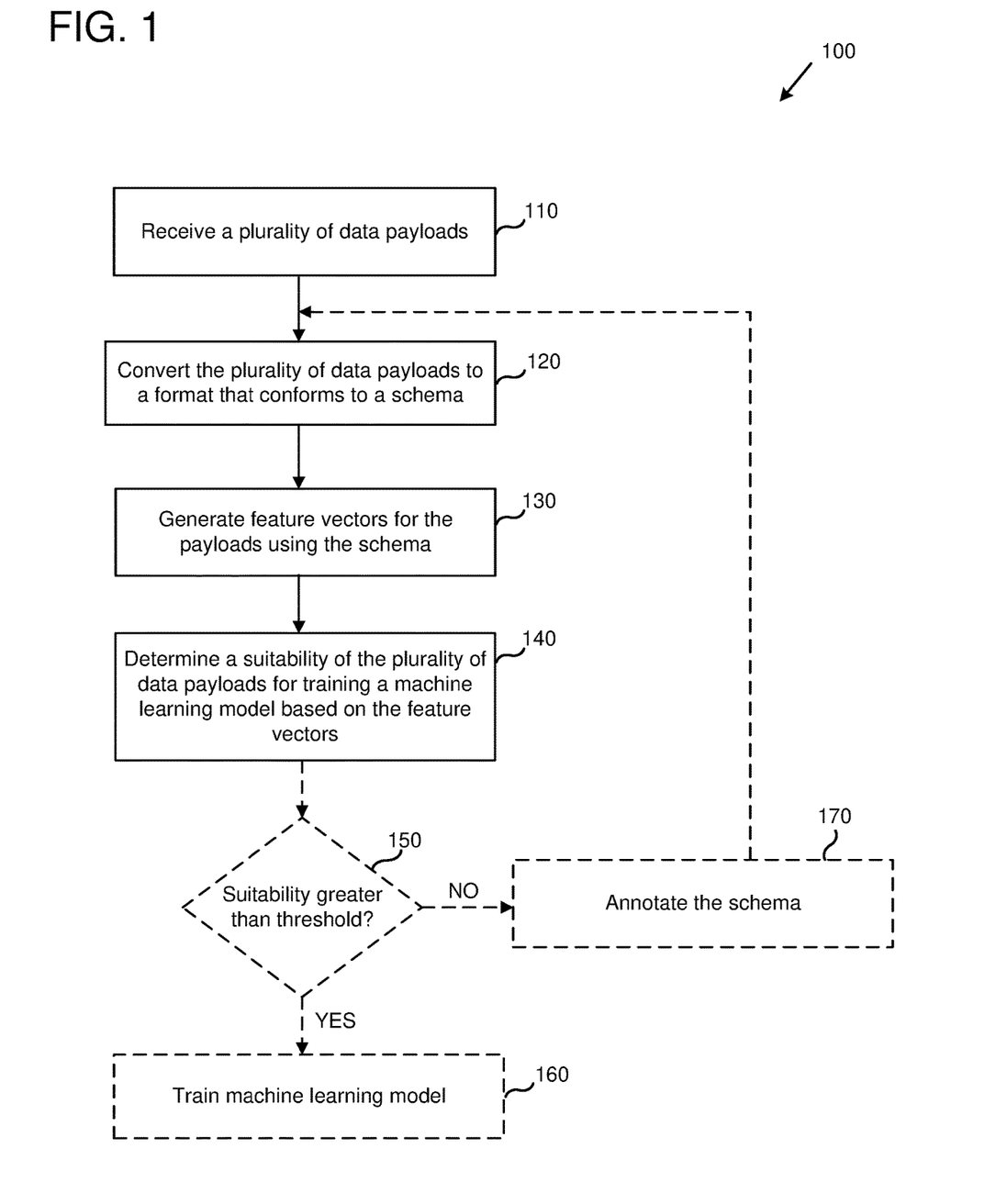
FIG. 1 is a flowchart of an example method for determining a suitability of a plurality of data payloads for training a machine learning model.
Figure 2:
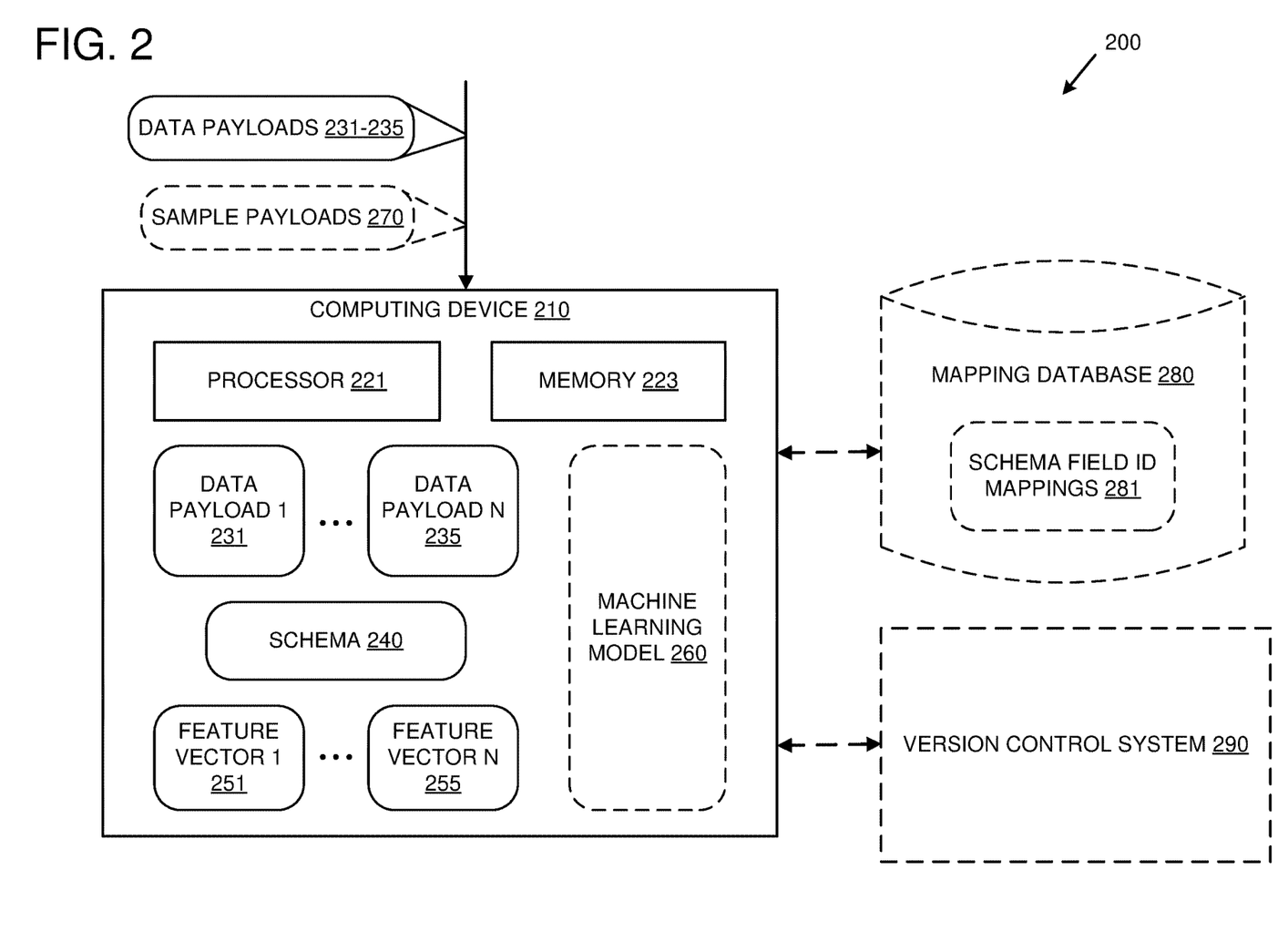
FIG. 2 is a system diagram depicting an example system for determining a suitability of a plurality of payloads for training a machine learning model.

FIG. 1 is a flowchart of an example method 100 for determining a suitability of a plurality of data payloads for training a machine learning mode. Any of the example systems described herein can be used to perform all or part of the example method 100. For example, the example system 200, depicted in FIG. 200, can be used to perform all or part of the example method 100.

FIG. 2 is a system diagram depicting an example system 200 for determining a suitability of a plurality of data payloads 231-235 for training a machine learning model (e.g., 260). The example system 200 comprises a computing device 210 that comprises a processor 221 and a memory 223 storing instructions that, when executed by the processor 221, cause the computing device 210 to perform operations as described herein. The data payloads 231-235, a schema 240, and a plurality of feature vectors 251-255 can be stored in the memory 223 and/or one or more other computer-readable storage media of the computing device 210.

At 110, a plurality of data payloads are received. For example, the computing device 210 can receive the plurality of data payloads 231-235. The plurality of data payloads can be received via one or more wired and/or wireless communication channels (such as one or more wired and/or wireless computer networks, etc.). In at least some embodiments, the plurality of data payloads 231-235 can conform to one or more data formats. In some embodiments, the data formats can be associated with various business data models (e.g., sales orders, purchase orders, operating agreements, requisitions). For example, the plurality of data payloads 231-235 may contain sales order data organized in one or more data formats associated with one or more sales order business data models. In at least some embodiments, the plurality of data payloads 231-235 can contain data organized using one or more JavaScript Object Notation (JSON) data formats. However, other types of data formats (such as eXtensible Markup Language (XML) data formats, YAML data formats, etc.) can be used instead of, or in addition to, such JSON data formats. In some cases, multiple types of data formats can be supported.

At 120, the plurality of data payloads are converted to a format that conforms to a schema. For example, the computing device 210 can convert the plurality of data payloads 231-235 to a format that conforms to a schema 240. The schema 240 can contain a plurality of field definitions. Such field definitions can include field names and field data types. Field definitions can also contain additional information, such as field definitions, whether or not a given field is required, a number of times a field can be repeated, etc. The schema 240 can also define an organization for data payloads that conform to the schema 240. The schema can be formatted using a JSON format, an XML format, a YAML format, or the like.

Converting the plurality of data payloads 231-235 can comprise identifying a type of data contained in the plurality of data payloads 231-235, identifying a schema associated with that type of data, and converting the plurality of data payloads 231-235 to a format that conforms with the identified schema. For example, the computing device 210 can analyze the plurality of data payloads 231-235 and determined that the plurality of data payloads 231-235 contain sales order data. The computing device 210 can identify a schema (e.g., 240) associated with sales order data, and can convert the plurality of data payloads 231-235 to a data format that conforms to the identified schema.

In at least some embodiments, the schema can be used as part of the identification process. For example, the computing device 210 can access a plurality of schemas (not shown) and can compare fields in one or more of the plurality of data payloads 231-235 to field definitions in the plurality of schemas, and can select a schema (e.g., 240) that most-closely matches the fields in the plurality of data payloads 231-235. Additionally or alternatively, the plurality of data payloads 231-235 can include schema identifiers that are associated with the schema 240. In such an embodiment, the schema 240 can be selected based on the schema identifiers.

In at least some embodiments, schema field identifier mappings (e.g., schema field identifier mappings 281 stored in a database 280) can be used to correlate different field names to a same field definition in a schema. For example, such mappings may indicate that a "record_id" field in one data payload, and an "_id" field in another data payload are both matches to an "id" field definition in a given schema. Such mappings can be used in addition to the schema 240 to convert the plurality of data payloads 231-235 from a plurality of different data formats to a single data format that conforms to the schema 240.

At 130, feature vectors are generated for the plurality of data payloads using the schema. For example, the computing device 210 can generate a plurality of feature vectors 251-255 for the plurality of data payloads 231-235. For example, the feature vector 251 can be generated for the data payload 231, the feature vector 255 can be generated for the data payload 235, etc.

A feature vector can identify which features of the schema 240 (such as fields defined in the schema 240) are included in an associated data payload. For example, the feature vector 251 can identify which fields defined in the schema 240 are included in the data payload 231. Similarly, the feature vector 255 can identify which fields defined in the schema 240 are included in the data payload 251. In at least some embodiments, the feature vectors can be defined as unit vectors. In such an embodiment, features defined in the schema 240 can be associated with indices in a feature vector, and values of 1 or 0 stored at the indices indicate whether the corresponding features are included in an associated data payload.

At 140, a suitability of the plurality of data payloads for training a machine learning model is determined based on the feature vectors. For example, the computing device 210 can use the feature vectors 251-255 to determine a suitability of the plurality of data payloads 231-235 for training a machine learning model (e.g., 260). Determining the suitability for training the machine learning model (e.g., 260) can comprise comparing the feature vectors 251-255 to one another to determine a similarity of the plurality of data payloads 231-235 to one another. In at least some embodiments, determining the suitability comprises comparing the feature vectors 251-255 to one another using a cosine similarity. For example, a cosine similarity can be determined for each feature vector with respect to every other feature vector. A cosine similarity can be determined by calculating a cosine of an angle between two given feature vectors:

$$\cos\theta = \frac{a \cdot b}{|a||b|} \qquad \text{(Equation 1)}$$

Where a is a first vector, b is a second vector, and θ is the angle between a and b. The cosine of the angle between two vectors can indicate how similar the vectors are to one another. For example, two vectors are identical when the cosine of the angle between them is 1 (one), and two vectors are orthogonal when the cosine of the angle between them is 0 (zero). Thus, a cosine value that is closer to 1 (one) indicates that two vectors are more similar, and a cosine value that is closer to 0 (zero) indicates that two vectors are more dissimilar.

Once the similarities of the feature vectors have been determined (using cosine similarity or another comparison process), the similarity values can be aggregated to determine an overall similarity of the plurality of data payloads 231-235. Additionally or alternatively, a similarity index can be generated based on the comparisons, wherein the similarity index identifies a similarity of each feature vector with respect to every other feature vector. In at least some embodiments, the feature vectors can be clustered based on the similarity values to identify groups of data payloads, in the plurality of data payloads 231-235, that are similar to one another. In some scenarios, such clustering can also be used to identify outlier data payloads. Such outliers can be excluded in some cases in order to boost the overall similarity score of the remaining data payloads.

Optionally, at 150, it can be determined whether the suitability is greater than a specified threshold. If it is determined at 150 that the suitability is greater than the specified threshold then, optionally at 160, a machine learning model can be trained using the plurality of data payloads. For example, the machine learning model 260 can be trained using the plurality of data payloads 231-235. The versions of the plurality of data payloads 231-235 that have been converted into the format conforming to the schema 240 can be used to train the machine learning model 260. For example, the machine learning model 260 can be trained using an algorithm that expects input records in the format that conforms to the schema 240. Alternatively, the plurality of data payloads 231-235 can be converted into another format that can be processed by a machine learning algorithm that is used to train the machine learning model 260. For example, a mapping can be specified that defines how to convert data payloads from the format conforming to the schema 240 to a format that can be processed by a machine learning algorithm.

If it is determined at 150 that the suitability does not exceed the specified threshold then, optionally at 170, the schema can be annotated to produce an annotated schema. Annotating the schema can comprise editing feature definitions (such as field definitions) of the schema 240, adding additional feature definitions to the schema 240, and/or removing feature definitions from the schema 240. Additionally or alternatively, the annotating can comprise adding and/or editing mappings (such as the mappings 281 in the database 280) that correlate known field identifiers to field definitions in the schema 240. For example, mappings can be added to correlate one or more previously uncorrelated field identifiers in one or more of the plurality of data payloads 231-235 to one or more field definitions in the schema 240.

After the schema is annotated at 170, then steps 120-140 can be repeated using the annotated schema. For example, the plurality of data payloads 231-235 can be converted to a format that conforms to the annotated schema and new feature vectors can be generated for the plurality of data payloads 231-235 using the annotated schema. A new suitability of the plurality of data payloads for training a machine learning algorithm can then be determined based on the new feature vectors.

Example 3

Example Systems and Methods for Schema Generation

In any of the examples described herein, systems and methods can be provided for generating schemas based on a plurality of data payloads.

Figure 3:
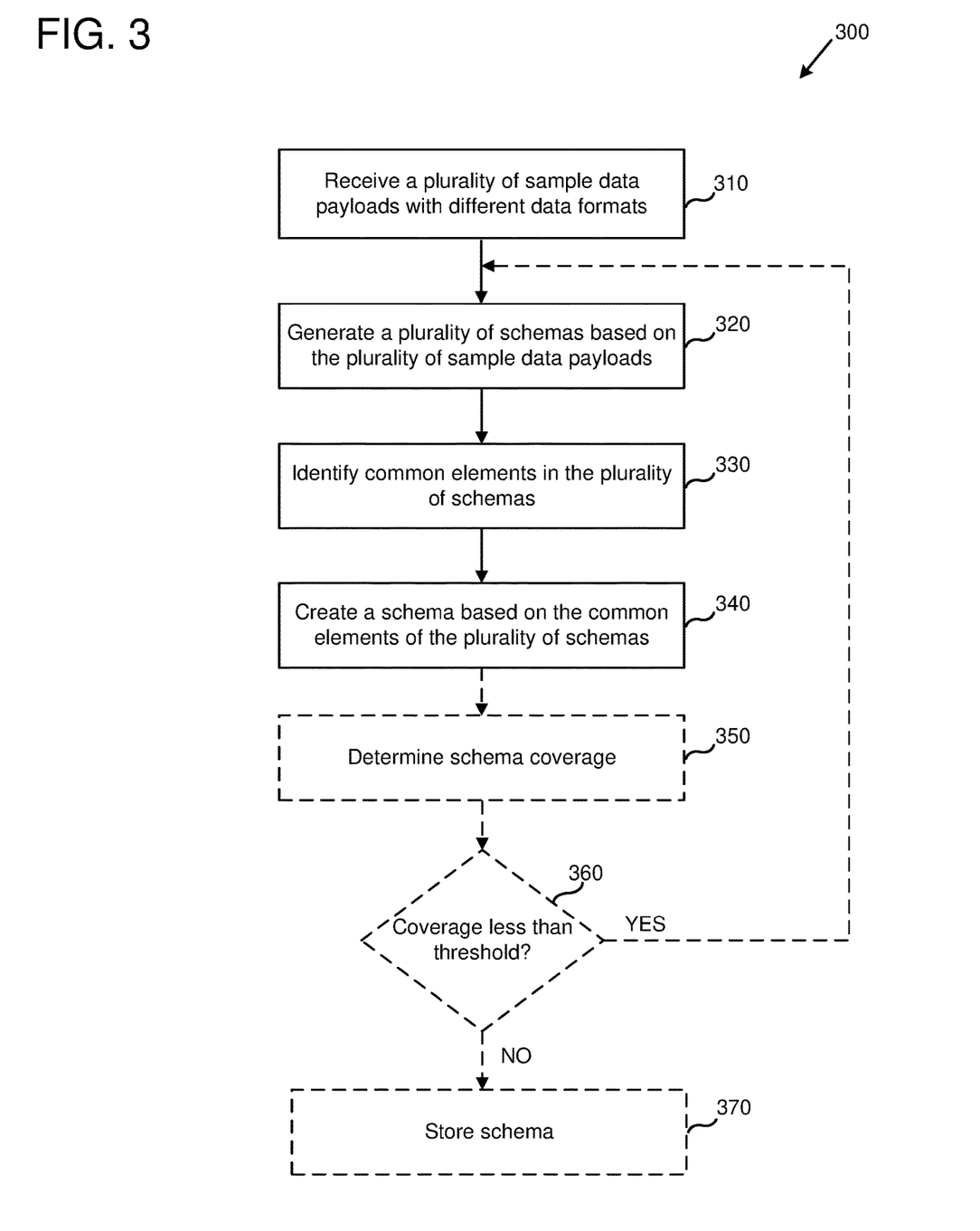
FIG. 3 is a flowchart of an example method for generating a schema based on a plurality of sample data payloads.

FIG. 3 is a flowchart of an example method 300 for generating a schema based on a plurality of sample data payloads. Any of the example systems described herein can be used to perform all or part of the example method 300. For example, the example system 200 can be used to perform all or part of the example method 300.

At 310, a plurality of sample data payloads with different data formats are received. For example, a plurality of sample data payloads 270 can be received by the computing device 210. The plurality of sample data payloads 270 can be received via one or more wired and/or wireless communication channels (such as one or more wired and/or wireless computer networks). In at least some embodiments, the plurality of sample data payloads 270 can have different data formats. The different data formats can comprise different JSON formats, different XML formats, different YAML formats, etc. In at least some such embodiments, the different data formats can be associated with different geographic regions. For example, in a scenario where the plurality of sample data payloads comprise sales order data, the plurality of sample data payloads 270 can be formatted using data formats that are used to format sales order data in different geographic regions.

At 320, a plurality of schemas are generated based on the plurality of data payloads. For example, the computing device 210 can generate a plurality of schemas (not shown) based on the plurality of sample data payloads 270. Generating a schema for a sample data payload can comprise identifying features of the sample data payload (such as data fields in the sample payload) and creating feature definitions (such as field definitions) for the schema based on the identified features. In at least some embodiments, creating a schema for a sample data payload can further comprise performing type inference for identified fields based on associated field values in the sample data payload.

In at least some embodiments, generating the plurality of schemas comprises annotating one or more of the plurality of sample data payloads. For example, the computing device 210 can automatically generate the plurality of schemas and can enable a user of the computing device 210 (and/or one or more users of one or more other computing devices) to annotate the generated schemas. Annotating the schemas can comprise editing the generated schemas. Additionally or alternatively, annotating the schemas can comprise generating new versions of the schemas.

At 330, common elements in the plurality of schemas are identified. For example, the computing device 210 can identify common elements in the plurality of schemas generated based on the plurality of sample data payloads 270. The computing device 210 can identify features (such as fields) in the various schemas that have a same or similar names and/or same or similar data types. The computing device 210 can correlate these identified features to one another to indicate that they are common elements. In at least some embodiments, schema field identifier mappings (such as schema field identifier mappings 281 and stored in the database 280) can be used to identify fields of the generated schemas that have same or similar names and/or same or similar data types as features that have previously been correlated. Such mappings can be used, in at least some circumstances, to correlate fields and other features that previous experience has shown to be common elements, even though they have different names and/or data types in data payloads having different data formats.

At 340, a schema is created based on the common elements of the plurality of schemas. For example, the computing device 210 can create the schema 240 based on the common elements of the plurality of schemas generated for the plurality of sample data payloads 270.

Optionally, at 350, a coverage of the schema with respect to the plurality of schemas can be determined. For example, the computing device 210 can determine a coverage of the schema 240 with respect to the plurality of schemas associated with the plurality of sample data payloads 270. Determining the coverage of the schema 240 can comprise ascertaining percentages of each of the generated schemas associated with the sample data payloads 270 that are covered by the identified common elements. For example, identified common elements may represent thirty five percent of feature definitions contained in a schema associated with one sample data payload, and may represent seventy three percent of feature definitions in another schema associated with another sample data payload. Once coverage percentages are determined for all of the schemas associated with the sample data payloads 270, an overall coverage metric can be determined. For example, the coverage percentages can be aggregated (such as by using a sum, average, median, etc.) to determine an overall coverage metric for the schema 240 with respect to the plurality of schemas.

Optionally, at 360, it can be determined whether the coverage is less than a specified threshold. If it is determined at 360 that the coverage is not less than the specified threshold then, optionally at 370, the schema can be stored. For example, the computing device 210 can determine whether coverage of the schema 240 is less than a specified threshold (not shown). If the coverage is not less than the specified threshold then the computing device 210 can store the schema 240 in one or more computer-readable storage media. The computing device may also store the plurality of schemas generated based on the plurality of data payloads 270. In at least some embodiments, the computing device 210 can store the schema 240 and/or the plurality of schemas generated based on the plurality of sample data payloads 270 in a version control system 290 (such as GIT, SVN, etc.).

If it is determined at 360 that the coverage is less than the specified threshold then, optionally, steps 320-340 can be repeated. In at least some scenarios, one or more of the plurality of sample data payloads can be annotated, or re-annotated, before the generating of the plurality of schemas at 320 is repeated. For example, a sample data payload can be annotated to indicate that one or more fields of the sample data payload correlate to known one or more fields. The plurality of schemas can then be regenerated using the annotated (or re-annotated) sample data payloads. Common elements of the regenerated plurality of schemas can then be identified, and the schema can be regenerated based on the identified common elements of the plurality of regenerated schemas.

In at least some embodiments, a suitability for training a machine learning model can be determined for a same plurality of data payloads that are used to generate the schema. For example, the plurality of sample data payloads 270 can be the plurality of data payloads 231-235. In such an embodiment, the plurality of data payloads 231-235 can be used to generate the schema 240. The plurality of data payloads 231-235 can then be used in conjunction with the schema 240 to determine a suitability of the plurality of data payloads 231-235 for generating a machine learning model. For example, the plurality of data payloads 231-235 can have different data formats, and can be used to generate the schema 240. The plurality of data payloads 231-235 can then be converted into a format that conforms to the schema 240. The feature vectors 251-255 can then be generated for the plurality of payloads 231-235 using the schema 240. A suitability of the plurality of data payloads 231-235 for training a machine learning model (e.g., 260) can then be determined based on the feature vectors 251-255.

Example 4

Example Data Payloads

In any of the examples described herein, a data payload can comprise a plurality of data fields organized according to a data format.

Figure 4:
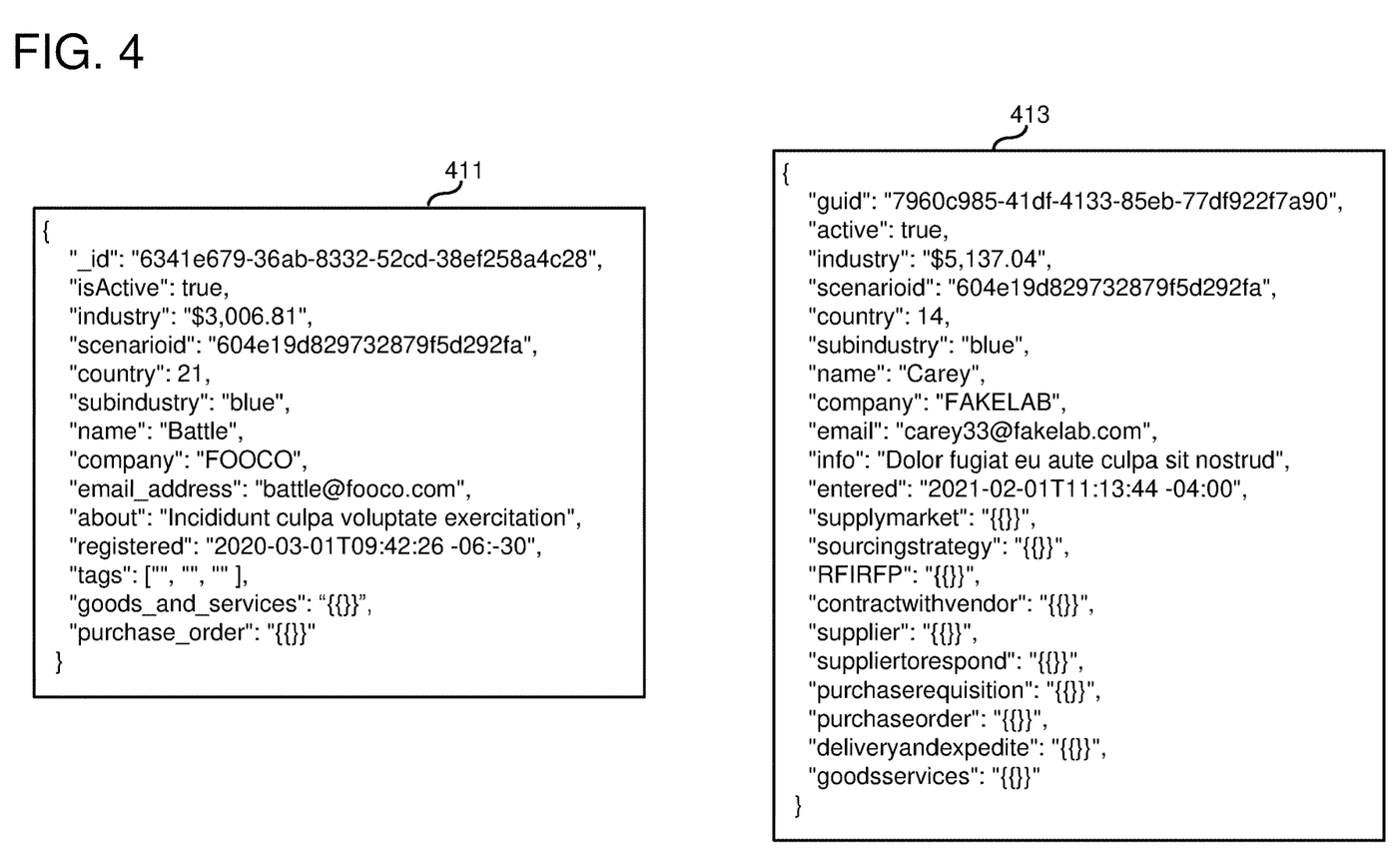
FIG. 4 is a diagram depicting example data payloads.

FIG. 4 is a diagram depicting example data payloads 411 and 413. The example data payloads 411 and 413 are formatted using JavaScript Object Notation (JSON) data formats. However, that is not intended to be limiting. Other types of data formats (such as XML data formats, YAML data formats, binary data formats, comma-separated value data formats, etc.) can also be supported.

Example 5

Example Schemas

In any of the examples described herein, schemas can be provided for use in converting data payloads with different data formats into a common data format. Schemas can be generated based on data payloads, as described herein.

FIG. 5 is a diagram depicting example schemas 511, 513, and 521. The example schema 511 is generated based on the example data payload 411, depicted in FIG. 4. The example schema 511 comprises field names and field data types that have been inferred based on the contents and structure of the example data payload 411. The example schema 513 is generated based on the example data payload 413, depicted in FIG. 4. The example schema 513 comprises field names and field data types that have been inferred based on the contents and structure of the example data payload 413.

The example schema 521 is generated based on the schemas 511 and 513. Common elements in the example schemas 511 and 513 have been identified and are included once in the schema 521. Elements that are not common, and are included in either schema 511 or schema 513 but not in both, are also included in the example schema 521. However, in at least some embodiments, elements that are not common to the schemas can be omitted from the generated schema. A mapping record 523 can be used to identify the common elements generate the example schema 521. For example, the mapping record 523 correlates the "_id" field definition in the schema 511 with the "guid" field definition in the schema 513, the "isActive" field definition in the schema 511 with the "active" field definition in the schema 513, the "email address" field definition in the schema 511 with the "email" field definition in the schema 513, the "about" field definition in the schema 511 with the "info" field definition in the schema 513, the "registered" field definition in the schema 511 with the "entered" field definition in the schema 513, the "goods_and_services" field definition in the schema 511 with the "goodsservices" field definition in the schema 513, and the "purchase_order" field definition in the schema 511 with the "purchaseorder" field definition in the schema 513.

In at least some embodiments, the mapping record 523 can be stored as part of a mapping database. The mapping record 523 can be generated based on an analysis of the example data payloads 411 and 413. Additionally or alternatively, the mapping record 523 can be generated and/or edited as part of an annotation process as described herein.

In at least some scenarios, a mapping record can be generated based on annotations of sample data payloads. For example, the mapping record 523 can be generated, at least in part, based on annotations of the example data payloads 411 and 413 which identify correlations between fields in the data payloads that have different names. Additionally or alternatively, the mapping record can be generated or updated based on the analysis of multiple data payloads. For example, as correlations between fields in different data payload formats are identified, they can be stored in one or more mapping records (for example in a mapping database). The one or more mapping records can be referenced in subsequent analysis of additional data payloads to identify correlations between fields in the additional data payloads and fields in one or more previously generated schemas. Thus, in at least some scenarios, a schema (such as example schema 521) can evolve over time as additional data payloads with different data formats are analyzed and mapped to the existing schema fields.

Example 6

Example Converted Data Payloads and Feature Vectors

In any of the examples described herein, converted data payloads and feature vectors can be provided for determining a suitability of a plurality of data payloads for training a machine learning model.

Figure 6:
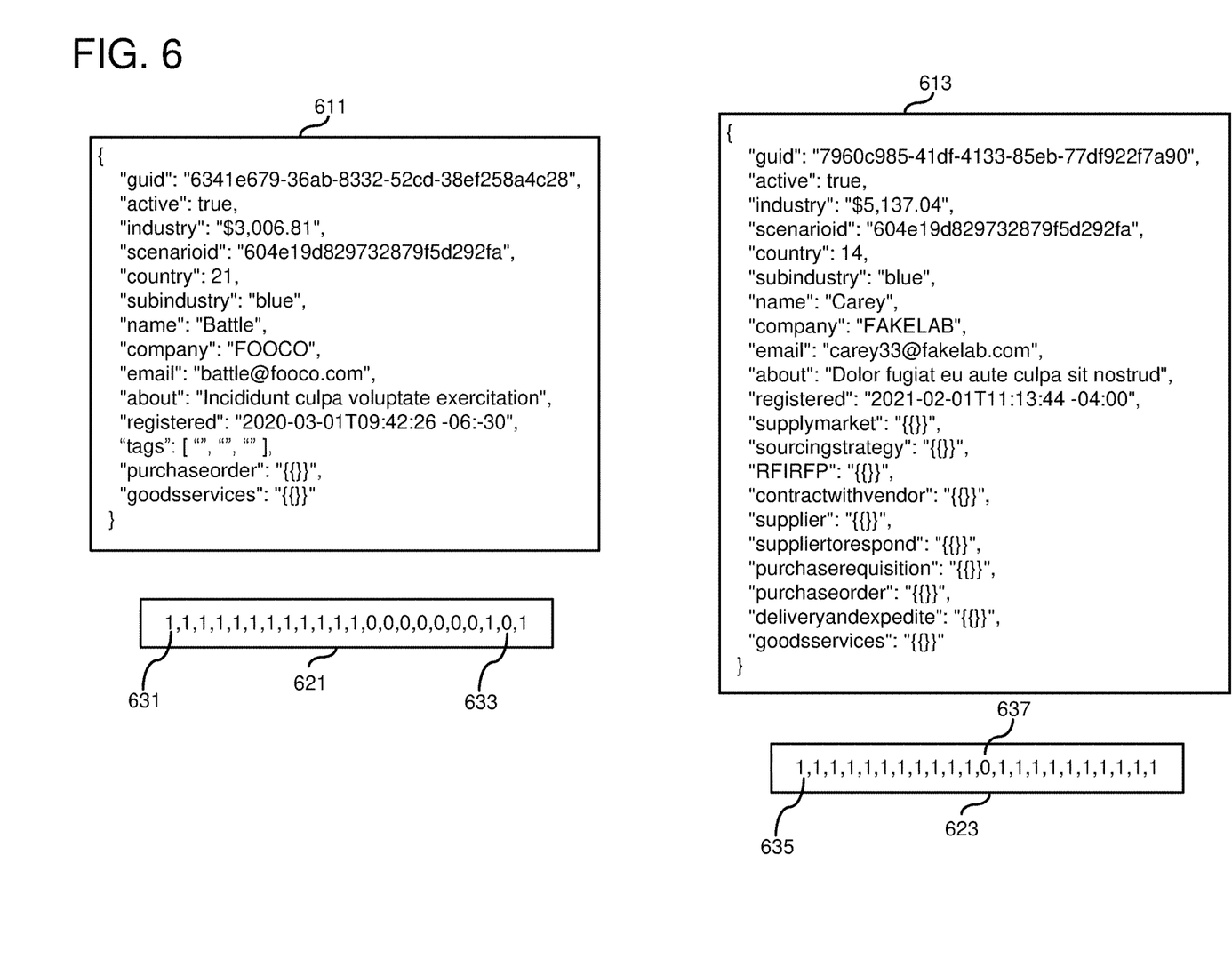
FIG. 6 is a diagram depicting example converted data payloads and example feature vectors.

FIG. 6 is a diagram depicting example converted data payloads 611 and 613, and example feature vectors 621 and 623. The example converted data payloads 611 and 613 are based on the example data payloads 411 and 413 (depicted in FIG. 4), respectively. The example payload 611 represents a conversion of the data payload 411 to a format conforming to the schema 521 (depicted in FIG. 5). The example payload 613 represents a conversion of the data payload 413 to a format conforming to the schema 521.

The example mapping record 523 (depicted in FIG. 5) can be used to map fields in the data payloads to corresponding fields in the schema 521. For example, the mapping record 523 indicates that the "_id" field in the payload 411 correlates to the "guid" field definition in the schema 521. For example, the mapping record 523 indicates that the "info" field in the payload 413 correlates to the "about" field definition in the schema 521. The conversion process can include additional operations (such as data type conversions, data constraint enforcement, etc.).

The example feature vectors 621 and 623 indicate which field definitions in the schema 521 are included in the respective converted data payloads 611 and 613. In the example depicted in FIG. 6, a feature vector includes indices which correspond to field definitions in the schema 521. A value of 1 (one) for a given index indicates that a field corresponding to the associated field definition is present in the data payload, and a value of 0 (zero) for a given index indicates that a field corresponding to the associated field definition is not present in the data payload. For example, index 631 in the feature vector 621 has a value of 1 (one) because the converted data payload 611 contains a field ("guid") that corresponds to the field definition for "guid" in the schema 521; however, index 633 in the feature vector 621 has a value of 0 (zero) because the converted data payload 611 does not contain a field that corresponds to the field definition for "deliveryandexpedite" in the schema 521. For example, index 635 in the feature vector 623 has a value of 1 (one) because the converted data payload 613 contains a field ("guid") that corresponds to the field definition for "guid" in the schema 521; however, index 637 in the feature vector 623 has a value of 0 (zero) because the converted data payload 613 does not contain a field that corresponds to the field definition for "tags" in the schema 521.

The feature vectors 621 and 623 can be used to determine a suitability of the data payloads 411 and 413 for training a machine learning model. For example, the feature vectors 621 and 623 can be analyzed to determine how similar the feature vectors are to one another. Such a similarity analysis can comprise determining a cosine similarity of the feature vectors 621 and 623.

Although the examples depicted in FIGS. 4-6 have dealt with two example data payloads, the process can be repeated for any number of data payloads. In some embodiments, one set of sample data payloads can be used to generate a schema (e.g., 521) and determine a suitability for training a machine learning model, and one or more other data payloads can be converted to a format that conforms to the schema and used to train the machine learning model. In some scenarios, a schema can be generated using a plurality of data payloads and then revised based on one or more additional data payloads (such as additional payloads that conform to different data formats than previously processed data payloads).

Example 7

Example Machine Learning Models

In any of the examples described herein, a machine learning model can comprise one or more data structures generated by a machine learning process. Machine learning processes can comprise supervised learning processes, unsupervised learning processes, semi-supervised learning processes, or some combination thereof. Example machine learning models include artificial neural networks, decision trees, support vector machines, etc. A machine learning model can be generated by processing training records using a machine learning process. Training records can comprise one or more input fields (sometimes referred to as independent variables) and one or more output fields (sometimes referred to as dependent variables). A machine learning model can comprise a representation of one or more relationships generalized by a machine learning process based on the training records. In scenarios where it is determined that a plurality of data payloads are suitable for training a machine learning model, all, or part, of the plurality of data payloads can be used as training records to train the machine learning model. In at least some scenarios, it may be necessary to convert the plurality of data payloads to another data format that can be processed by a machine learning algorithm.

In any of the examples described herein, generating a machine learning model can comprise generating an artificial neural network.

An artificial neural network comprises a plurality of artificial neurons (also referred to as perceptrons or nodes) that can be configured to receive input, combine the input with an internal state (sometimes referred to as activation), and produce an output. In at least some embodiments, a neuron can be associated with an activation threshold which limits an activation of a neuron to scenarios where a given activation value rises above (or falls below) the given threshold. Initial inputs for an artificial neural network can comprise one or more data values. Example inputs can include digital representations of images, documents, data arrays, etc. An ultimate output of an artificial neural network comprises one or more values that represent a result. In at least some embodiments, an activation function can be provided which provides a smooth transition as input values change (e.g., a small change in input produces a small change in output).

The artificial neural network comprises edges (also referred to as connections). An edge connects two neurons and has a direction which identifies one of the neurons as an output neuron and the other neuron as an input neuron. If an activation function of the output neuron generates a value, the value is provided as an input value of the input neuron. An edge can be associated with a weight value that can represent a relative importance of the edge. In such an embodiment, the output value of the output neuron can be modified using the weight value before it is provided to the input neuron. A given neuron can have multiple input and/or output edges.

In at least some artificial neural networks, neurons are organized into multiple layers. Neurons of one layer can connect to neurons of an immediately preceding layer or an immediately following layer. The layer that receives external data as input values can be referred to as an input layer. A layer that produces an ultimate result can be referred to as an output layer. Zero or more layers of neurons can exist between the input layer and the output layer. These layers can be referred to as hidden layers. However, single-layer and unlayered networks are also possible. Various connection patterns can be used to connect the neurons of one layer to neurons of another layer. For example, the neurons of two layers can be fully connected, meaning that every neuron in one layer has edges connecting it to every neuron in the next layer. In another example, connection pools can be used, in which a group of neurons in one layer all have edges connecting to a single neuron in the next layer. In such embodiments, the number of neurons in the next layer can be reduced, thereby concentrating outputs from a larger number of neurons in the preceding layer into a smaller number of neurons in the following layer. Neurons with such connections form a directed acyclic graph and can be referred to as feedforward networks. Alternatively, networks can allow edges between nodes in a same layer and/or from neurons in one layer back to neurons in a preceding layer. Such networks can be referred to as recurrent networks.

An artificial neural network can be trained by adapting the artificial neural network based on sample observations. Training can comprise adjusting weights of edges (and/or optional activation thresholds of neurons) to improve the accuracy of the results generated by the artificial neural network. This can be done by attempting to minimize observed errors. Such attempts to minimize observed errors can comprise using techniques such as backpropagation. In at least some scenarios, training can be considered to be complete when examining additional observations does not usefully reduce an error rate of the artificial neural network. However, even after an initial training phase, learning can still continue if new results and associated accuracy values cause an error rate of the artificial neural network to fall below a given threshold.

In at least some embodiments, weights can be adjusted based on feedback. Additionally or alternatively, additional input layer nodes and/or additional hidden layer nodes can be added to the artificial neural network in an attempt to increase accuracy in response to feedback.

Feedback data can be received from one or more client computing devices. For example, the feedback data can identify test scenarios which were correctly identified as successes and/or failures and/or test scenarios which were incorrectly identified as successes and/or failures. If errors in the feedback data cause the error rate of the artificial neural network to fall below an acceptable threshold, a server computer can use the feedback data (and optionally all or part of the initial training data) to re-train the artificial neural network; thereby generating an updated artificial neural network. The updated artificial neural network can then be used to perform subsequent exploratory testing. This process can be repeated as additional feedback data is received.

Various modes of training are possible. In at least some embodiments, each input creates one or more weights (and/or one or more activation thresholds) that are used to adjust the values transmitted from one neuron to another. For example, in an embodiment where input layer neurons are associated with data payload field values, weights can be used to change the values provided to connected neurons in a subsequent layer of the network.

Additionally or alternatively, weights (and/or activation thresholds) can be based on a batch of inputs. In at least some scenarios, stochastic learning modes can introduce noise. For example, by using a local gradient calculated from one data point, a chance that the artificial neural network will get stuck in a local minimum can be reduced. However, batch learning modes may yield a faster, more stable descent to a local minimum, since each update can be performed in a direction of the batch's average error. In at least some embodiments, a combination of both types of learning modes can be used.

Figure 7:
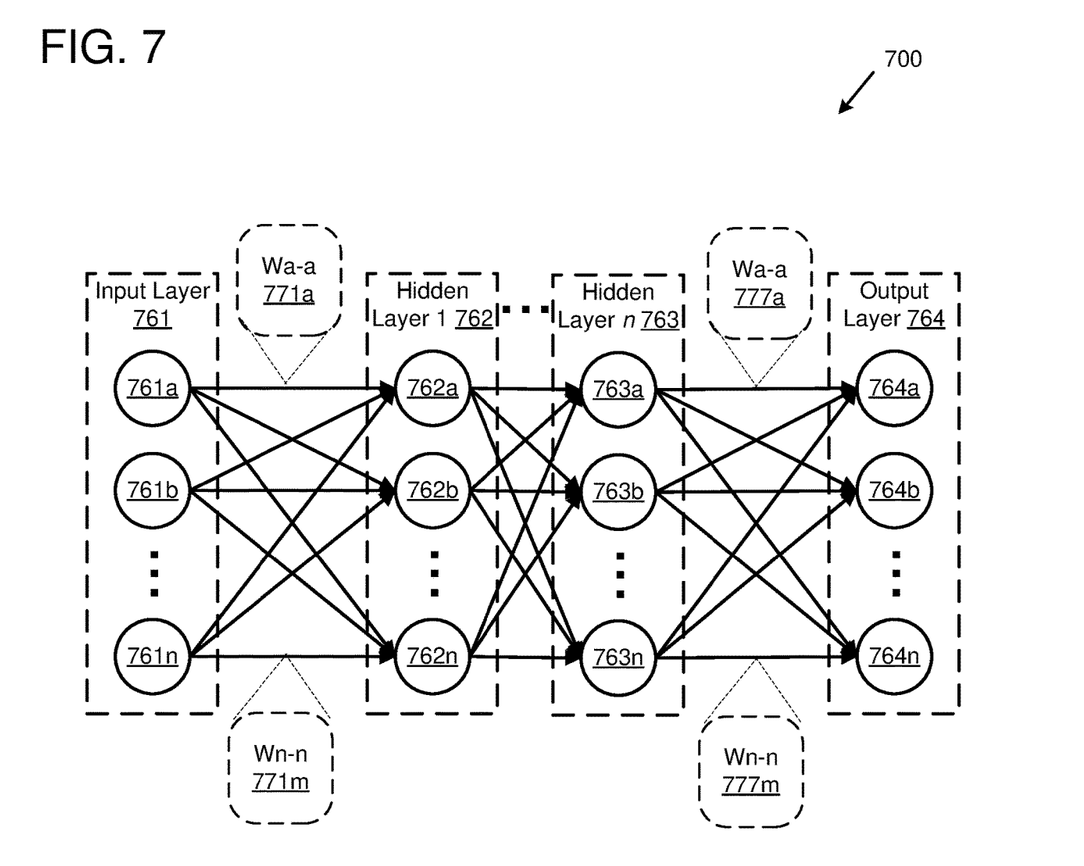
FIG. 7 is a diagram depicting an example artificial neural network.

FIG. 7 is a diagram depicting an example artificial neural network 700. The artificial neural network 700 can comprise a multilayer perceptron neural network. The neural network 700 may have an input layer 761, one or more hidden layers 762, 763, and an output layer 764. Each layer may have one or more nodes (or perceptrons). In at least some embodiments, the number of nodes at each layer is the same across the layers. Thus, the input layer 761 may have input nodes 761*a*, 761*b*, through 761*n*. Similarly, hidden layer 1 762 may have nodes 762*a*, 762*b*, though 762*n*, and so on through hidden layer n 763, which may have nodes 763*a*, 763*b*, through 763*n*. The output layer 764 may have nodes 764*a*, 764*b*, through 764*n*. However, layers with different numbers of nodes are also possible. A node may have one or more parameters, weights, coefficients, or other values, and one or more functions for the various inputs to that node.

The nodes of the artificial neural network 700 can be connected by edges with associated weights (e.g., 771a-771m and 777a-777m). For the sake of clarity, weights are not depicted for every edge depicted in FIG. 7. A weight can be used to modify an output value of a given node. The modified value can then be provided as input to another node. For example, an output of node 761a can be modified using weight 771a before the modified value is provided to node 762a as input.

The input layer 761 can accept an input vector to the neural network 700 and can begin neural network processing. (Although the neural network is referred to here as beginning the "processing," in at least some embodiments the artificial neural network 700 comprises a data structure representation of the neural network and associated executable code contains instructions for performing the processing of the input values through the neural network and producing the output values.) In some embodiments, the input layer 761 does not process the input vectors, other than any preprocessing necessary for the input vectors to be usable by the artificial neural network 700. In other embodiments, the input layer 761 may begin processing the input vectors using the functions and parameters at each node, similar to the hidden layers 762, 763.

The output of each layer can be the output of the various nodes at that layer. Further, nodes at a given layer can accept as input the output of one or more nodes at a preceding layer. For example, the output of input node 761a may be an input to one or more nodes in hidden layer 1 762, and so on for all the nodes in each successive layer. The output layer 764 may contain the final output values for the given input values in aggregate across its nodes 764a, 764b, through 764n. In this way, the artificial neural network 700 may be used to process input vectors through its various layers 761, 762, 763, 764, their respective nodes 761a-n, 762a-n, 763a-n, 764a-n, and their respective parameters and functions. In some embodiments, the layers 761, 762, 763, 764 may have varying numbers of nodes, while in other embodiments the layers may have the same number of nodes.

Example 8

Example Computing Systems

Figure 8:
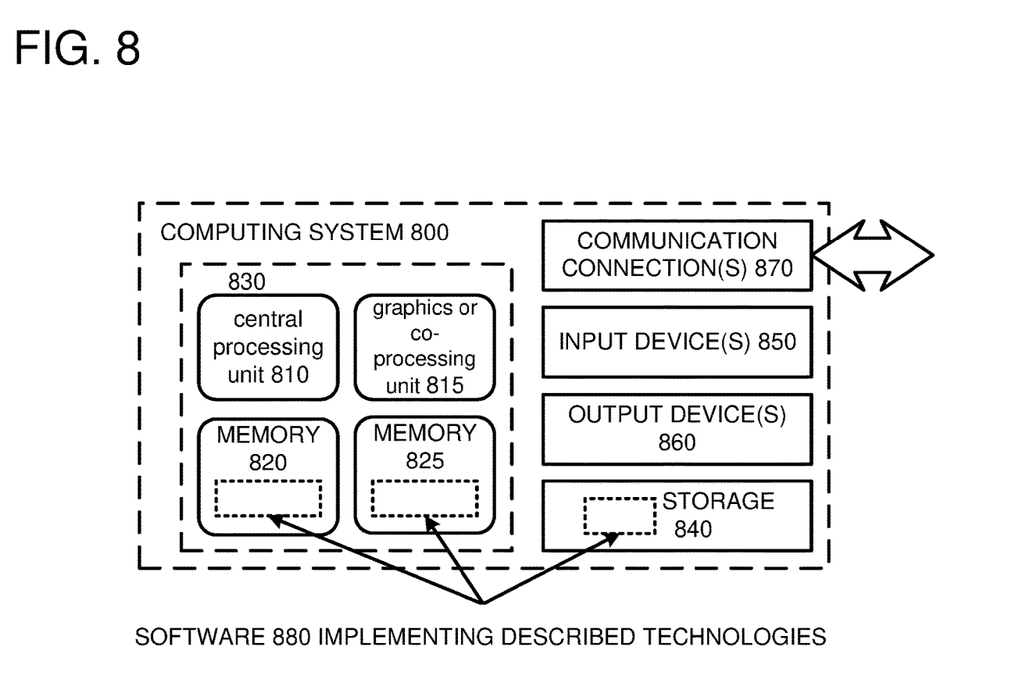
FIG. 8 is a block diagram of an example computing system in which some described embodiments can be implemented.

FIG. 8 depicts a generalized example of a suitable computing system 800 in which the described innovations may be implemented. For example, the computing system 800 can be used as a computing device as described herein. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, solid state drives, etc.), or some combination of the two, accessible by the processing unit(s). The memory 820, 825 can store software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, solid state drives, CD-ROMs, DVDs, or any other medium which can be used to store information in a non-transitory way and which can be accessed within the computing system 800. The storage 840 can store instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9

Example Cloud Computing Environment

Figure 9:
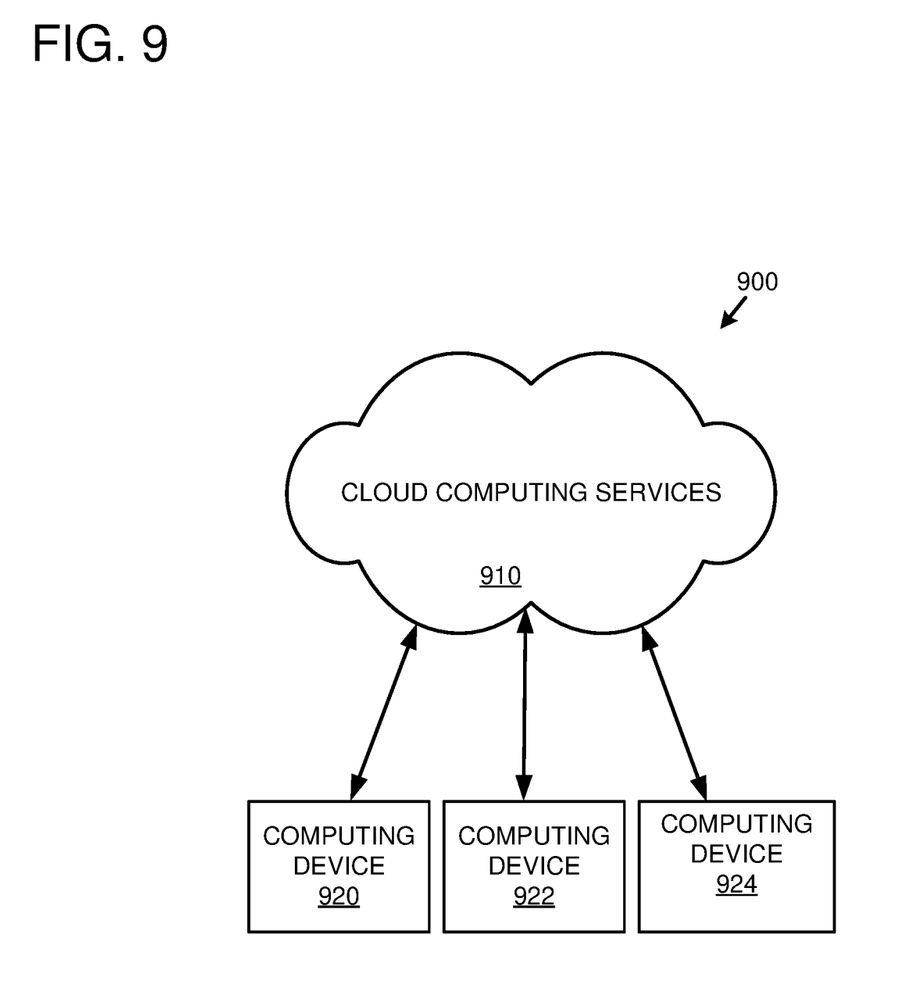
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. For example, one or more computer servers of the cloud computing services 910 can be used as a server as described herein. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like). One or more of the computing devices can be embedded devices that comprise integrated circuits (such as Internet of Things (IoT) devices, etc.).

Example 10

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or nonvolatile memory components (such as flash memory, solid state drives, or magnetic media such as hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Python, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method, comprising:
   generating a plurality of schemas based on a plurality of sample data payloads, wherein the plurality of sample data payloads have different data formats;
   identifying common elements in the plurality of schemas;
   creating a new schema based on the common elements of the plurality of schemas;
   determining a coverage of the new schema with respect to the plurality of schemas by ascertaining percentages of each of the generated plurality of schemas associated with the sample data payloads that are covered by the identified common elements;

storing the new schema responsive to determining that the coverage is not less than a first specified threshold or repeating the generating the plurality of schemas, the identifying the common elements in the plurality of schemas, and the creating the new schema based on the common elements of the plurality of schemas responsive to determining that the coverage is less than the first specified threshold;

receiving a plurality of data payloads;

converting the plurality of data payloads to a format that conforms to the new schema;

generating feature vectors for the plurality of data payloads using the new schema;

determining a suitability of the plurality of data payloads for training a machine learning model based on the feature vectors; and training the machine learning model using the converted plurality of data payloads responsive to determining that the suitability is greater than a second specified threshold.

2. The method of claim 1, wherein identifying common elements in the plurality of schemas comprises identifying fields in the plurality of schemas that have a same or similar names or same or similar data types.

3. The method of claim 1, wherein determining the suitability comprises comparing the feature vectors to one another using a cosine similarity.

4. The method of claim 2, wherein ascertaining percentages of each of the generated plurality of schemas associated with the sample data payloads that are covered by the identified common elements comprises determining respective percentages of feature definitions included in each of the plurality of schemas that are represented by identified common elements further comprising.

5. The method of claim 1, wherein the different data formats are associated with different geographic regions.

6. The method of claim 1, further comprising:
annotating the plurality of sample data payloads before repeating the generating the plurality of schemas.

7. The method of claim 1, wherein the new schema is formatted using a JavaScript object notation (JSON) format.

8. The method of claim 1, further comprising:
determining that the suitability does not exceed the second specified threshold;
annotating the new schema to produce an annotated schema;
converting the plurality of data payloads to a format that conforms to the annotated schema;
generating new feature vectors for the plurality of data payloads using the annotated schema; and
determining a new suitability of the plurality of data payloads for training a machine learning algorithm based on the new feature vectors.

9. A system, comprising:
a computing device comprising a processor and a memory storing instructions that, when executed by the processor, cause the computing device to perform operations, the operations comprising:
generating a plurality of schemas based on a plurality of sample data payloads, wherein the plurality of sample data payloads have different data formats;
identifying common elements in the plurality of schemas, the common elements including correlated fields and other features found in the plurality of schemas;
creating a new schema based on the common elements of the plurality of schemas;
determining a coverage of the new schema with respect to the plurality of schemas based on the identified common elements;
storing the new schema responsive to determining that the coverage is not less than a first specified threshold or repeating the generating the plurality of schemas, the identifying the common elements in the plurality of schemas, and the creating the new schema based on the common elements of the plurality of schemas responsive to determining that the coverage is less than the first specified threshold;
receiving a plurality of data payloads;
converting the plurality of data payloads to a format that conforms to the new schema;
generating feature vectors for the plurality of data payloads using the new schema;
determining a suitability of the plurality of data payloads for training a machine learning model based on the feature vectors; and
training the machine learning model using the converted plurality of data payloads responsive to determining that the suitability is greater than a second specified threshold.

10. The system of claim 9, wherein identifying common elements in the plurality of schemas comprises identifying fields in the plurality of schemas that have a same or similar names or same or similar data types.

11. The system of claim 9, wherein the generating the determining the suitability comprises comparing the feature vectors to one another using a cosine similarity.

12. The system of claim 10 wherein determining the coverage of the new schema comprises ascertaining percentages of each of the generated plurality of schemas associated with the sample data payloads that are covered by the identified common elements.

13. The system of claim 9, wherein the different data formats are associated with different geographic regions.

14. The system of claim 12, wherein ascertaining percentages of each of the generated plurality of schemas associated with the sample data payloads that are covered by the identified common elements comprises determining respective percentages of feature definitions included in each of the plurality of schemas that are represented by identified common elements.

15. The system of claim 9, wherein the operations further comprise:
determining that the suitability does not exceed a specified threshold;
annotating the schema to produce an annotated schema;
converting the plurality of data payloads to a format that conforms to the annotated schema;
generating new feature vectors for the plurality of data payloads using the annotated schema; and
determining a new suitability of the plurality of data payloads for training a machine learning algorithm based on the new feature vectors.

16. The system of claim 9, wherein the schema is formatted using a JavaScript object notation (JSON) format.

17. One or more computer-readable storage media storing instructions that, when executed by one or more processors, cause the one or more processors to perform operations, the operations comprising:
generating a plurality of schemas based on a plurality of sample data payloads, wherein the plurality of sample data payloads have different data formats;
identifying common elements in the plurality of schemas;

generating another schema based on the common elements of the plurality of schemas;

determining a coverage of the another schema with respect to the plurality of schemas by ascertaining percentages of each of the generated plurality of schemas associated with the sample data payloads that are covered by the identified common elements;

storing the another schema responsive to determining that the coverage is not less than a first specified threshold or repeating the generating the plurality of schemas, the identifying the common elements in the plurality of schemas, and the creating the new schema based on the common elements of the plurality of schemas responsive to determining that the coverage is less than the first specified threshold;

converting the plurality of data payloads into a format that conforms to the another schema;

generating feature vectors for the plurality of data payloads using the another schema;

determining a suitability of the plurality of data payloads for training a machine learning model based on the feature vectors; and training the machine learning model using the converted plurality of data payloads responsive to determining that the suitability is greater than a second specified threshold.

* * * * *